Dec. 13, 1938.  W. S. FREES  2,140,423
SELF-ADJUSTING AUTO SEAT
Filed April 19, 1937  2 Sheets-Sheet 1
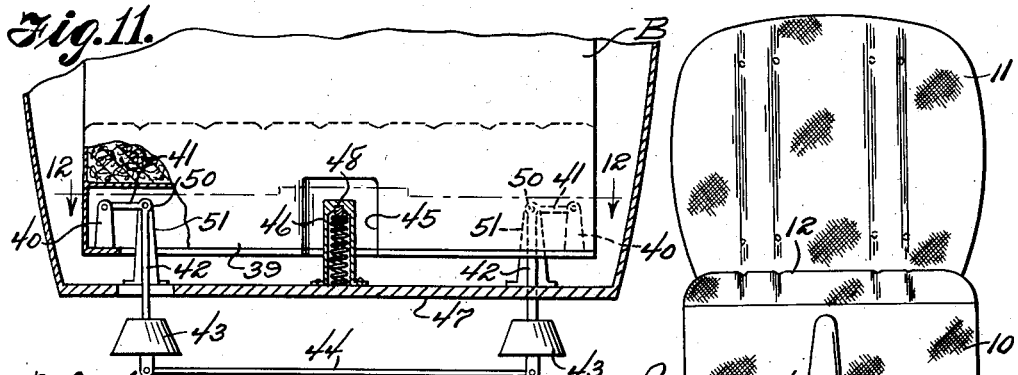
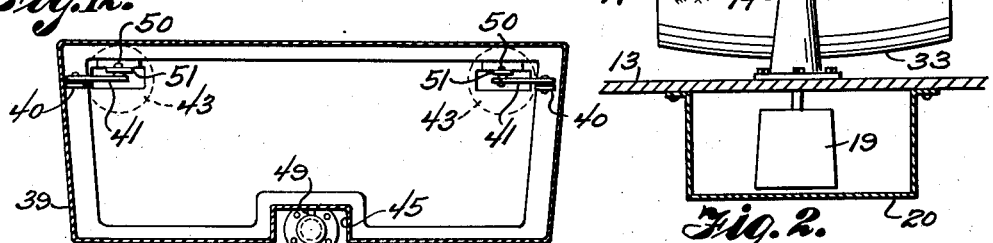
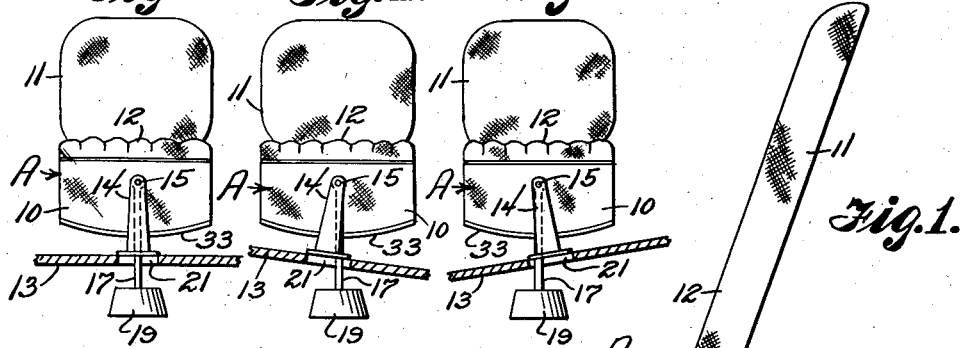
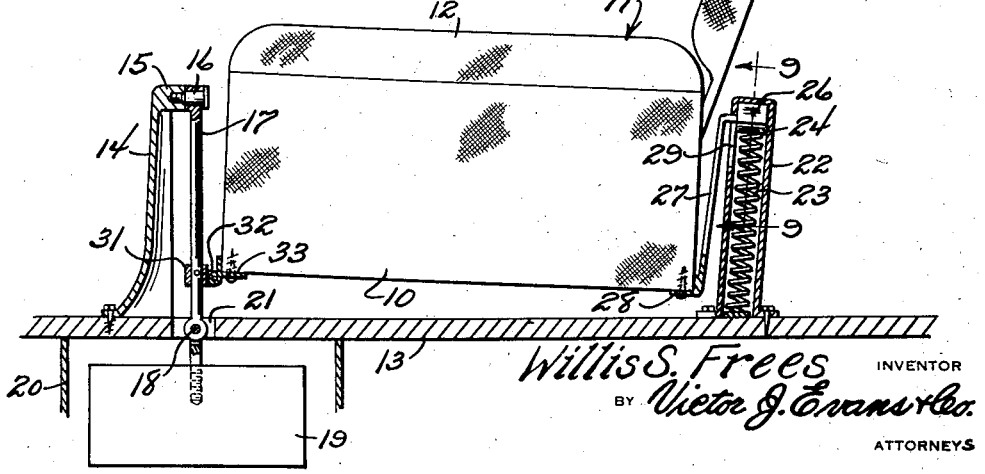
Willis S. Frees INVENTOR
BY Victor J. Evans & Co.
ATTORNEYS Dec. 13, 1938.  W. S. FREES  2,140,423
SELF-ADJUSTING AUTO SEAT
Filed April 19, 1937  2 Sheets-Sheet 2
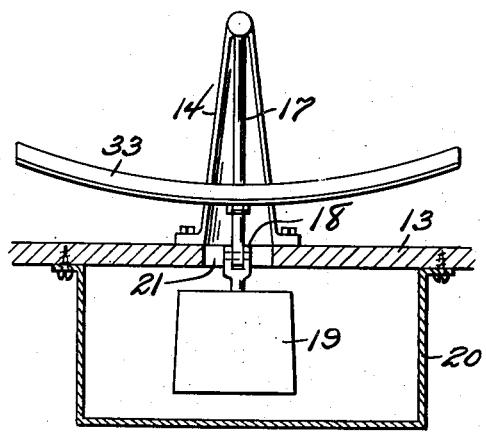
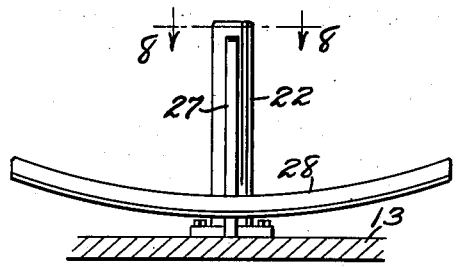
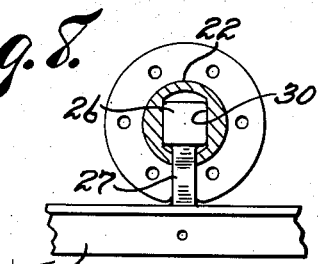
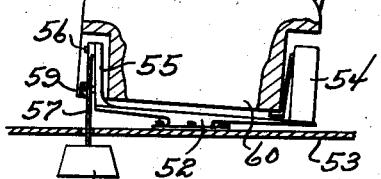
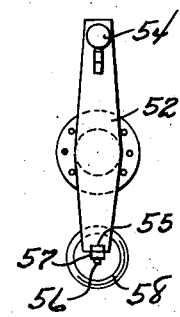
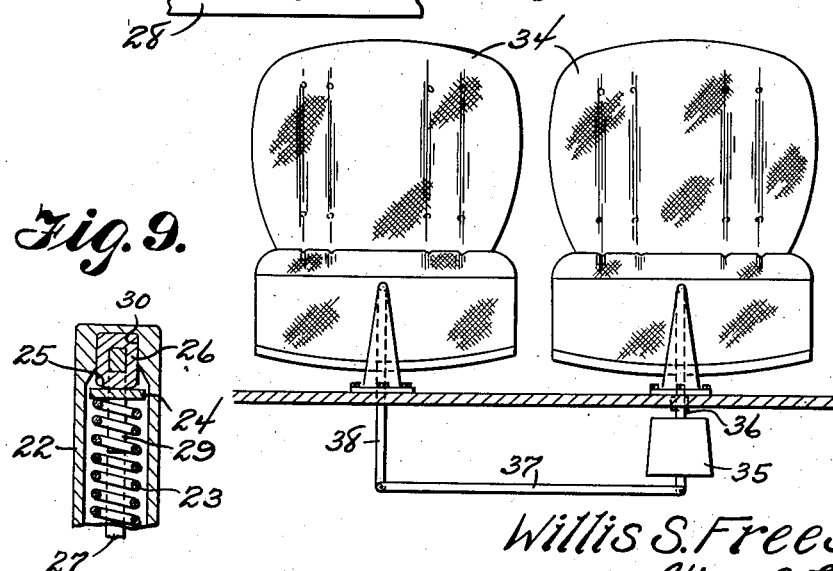
Willis S. Frees INVENTOR
BY Victor J. Evans & Co.
ATTORNEYS Patented Dec. 13, 1938

2,140,423

UNITED STATES PATENT OFFICE 2,140,423

SELF-ADJUSTING AUTO SEAT

Willis S. Frees, Garrettsville, Ohio

Application April 19, 1937, Serial No. 137,813

7 Claims. (Cl. 155—5)

The invention relates to motor vehicle seats and more especially to equipoise or self-adjustable seats for motor vehicles.

The primary object of the invention is the provision of a seat of this character, wherein the same when fitted within a vehicle will be sustained in a normal position or approximately perpendicular, irrespective of the side swing of a motor vehicle when in motion or otherwise, thereby enabling a person occupying the seat to maintain poise and correct posture without regard to the irregularities over which the vehicle travels or if the vehicle be an aircraft when in flight or when the vehicle is at a standstill.

Another object of the invention is the provision of a seat of this character, wherein the occupant of the seat will be relieved to a maximum degree, of shocks and jars incident to the travel of a motor vehicle carrying the seat and thus relieving weariness, fatigue and other discomforts and injurious effects to such occupant as well as assuring correct posture of the body of the occupant of the seat.

A further object of the invention is the provision of a seat of this character, wherein riding comfort is assured within a vehicle, whether it be a motor vehicle, aeroplane, railway car or any other motivated carrier.

A still further object of the invention is the provision of a seat of this character, which is simple in construction, thoroughly reliable and effective in operation, assuring safety to an occupant, being largely independent of the motion of the vehicle, relieving strain and is self-adjusting and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereinto appended.

In the accompanying drawings:

Figure 1 is a side elevation partly in section of a seat mounted and constructed in accordance with the invention.

Figure 2 is a front elevation partly in section thereof.

Figure 3 is a front elevation showing the seat in perpendicular position under normal conditions.

Figure 4 is a view similar to Figure 3 showing the vehicle or carrier displaced by side swing and the seat retained in normal perpendicular position.

Figure 5 is a view similar to Figure 4 showing the reverse side swing of the carrier.

Figure 6 is a fragmentary vertical transverse sectional view of the front support for the seat working from the rear thereof.

Figure 7 is a view similar to Figure 6 showing the rear support for the seat.

Figure 8 is an enlarged sectional view taken on the line 8—8 of Figure 7 looking in the direction of the arrows.

Figure 9 is a fragmentary sectional view taken on the line 9—9 of Figure 1 looking in the direction of the arrows.

Figure 10 is a front elevation of a pair of companion seats.

Figure 11 is a front elevation partly in section showing a slight modification of a double seat.

Figure 12 is a sectional view taken on the line 12—12 of Figure 11 looking in the direction of the arrows.

Figure 13 is a side elevation thereof.

Figure 14 is a detail plan view of the base rest of the same.

Similar reference characters indicate corresponding parts throughout the several views in the drawings.

Referring to the drawings in detail, particularly Figures 1 to 9 inclusive, A designates generally a seat involving a bottom 10 and a back 11, respectively, these being padded or cushioned at 12. The seat A is adapted for arrangement within a motivated carrier, for example, an automobile or motor vehicle, and in this instance a portion of the flooring of such vehicle being indicated at 13 to which are fixed front and rear fixtures with respect to the location of the seat A. The front fixture involves a channeled upright or post 14 provided at its upper end with a pivot bearing 15 in which is detachably secured a pivot 16 for swingingly suspending therefrom a pendulum arm 17 having a lower pivot end connection 18 with a weight 19, the latter being concealed or confined within an enclosure 20 beneath the floor 13 while the pendulum arm 17 is adapted for free play through a clearance 21 provided in the floor 13. This front fixture 14 is located at the perpendicular center of the seat A. The rear fixture is in the form of an upright cylinder 22 preferably arranged in a forward tilted position and in perpendicular center relation to the seat A. Confined within the cylinder 22 is a coiled expansion spring 23, its lower end being suitably seated while the upper end has contact with a follower 24 in engagement with the convexed lower side 25 of a rocker head 26 formed on a hanger arm 27 having a saddle 28 accommodating the bottom 10 of the seat A. This saddle 28 is fixed to the said bottom 10 of the seat. The cylinder is slotted at 29 affording a slide clearance for the hanger arm 27. The cylinder 22 interiorly thereof at its upper end is formed with a seat 30 for the head 26 which fixedly holds the said hanger arm 27 normally against swinging movement to give rigidity to the seat A until subjected to weight imposed thereon by an occupant. When this occurs, the head 26 will leave the seat 30 and the said seat A will be free for lateral swing or to assume a perpendicular position irrespective of the side tilt of the floor 13 resultant from the side sway of the carrier body.

Fixed to the pendulum arm 17 is the collar portion 31 of a pivot coupling 32 between it and a front saddle 33 fixed to the bottom 10 at its front. In this manner the seat A is yieldably and swingingly supported for occupancy. The weight 19 on the pendulum arm 17 will sustain the seat A perpendicular irrespective of the tilt of the carrier body or the lateral angular disposition of the floor 13. The spring 23 in the cylinder 22 yieldably holds the seat A at its rear and affords a shock absorber therefor, it having vertical swing on the pivot of the connection 32 at the front of the bottom 10 of such seat.

In Figure 10 of the drawings, there is shown a pair of separated individual companion seats 34, these being sustained perpendicular and operate in unison with each other by a single weight 35 carried by a front pendulum arm 36, there being a tie rod 37 pivotally connecting the other pendulum arm 38 with the said arm 36. Thus irrespective of the side tilt of a carrier body these companion seats 34 will maintain a perpendicular relationship to such side tilt.

In Figures 11 and 12 of the drawings, there is shown a modification wherein the seat B is a unitary double seat, its bottom 39 being fitted at the front forward corners thereof with bearings 40 to which are pivotally connected the short arms 41 of bell crank levers, 42, these being fitted with weights 43 and both levers are pivotally connected with a tie rod 44 while located at the vertical center of the said bottom 39 rearwardly therein is a recess 45 forming a clearance for a vertical cylinder 46 fixed to and rising from the floor 47 of a vehicle body while working within this cylinder 46 is the spring tensioned head 48 of a rear hanger arm 49 attached centrally to the bottom 39 of said seat B. The bell crank levers 42 are pivoted at 50 to upright supports 51 fixed to and rising vertically from the floor 47.

In Figures 13 and 14 of the drawings, there is shown a further modification, wherein a base stand 52 for a seat C is made secure to the carrier body floor 53 and this stand carries at its rear the cylinder 54 identical to the cylinders 22 and 46 and also the upright 55 to which is pivoted at 56 the pendulum arm 57 having the weight 58. The pendulum arm 57 has connection 59 with the seat bottom 60.

In the operation of the seat, the same will be perpendicularly supported irrespective of side tilt of the carrier body or the angular lateral swing of the floor beneath the seat and at the same time the said seat is yieldably and swingingly supported. The yieldability of the seat minimizes shocks and jars incident to the travel of the carrier being imparted to the occupant of the seat, assuring safety to such occupant and also maintaining correct posture to such occupant and in this manner giving comfort and tranquility to the said occupant.

What is claimed is:

1. The combination of a seat, stationary parts fore and aft of said seat, a hanger slidably and swingingly fitting one of the parts and supporting one end of said seat, and a weighted pendulum arm swingingly connected to the other part and supporting the other end of said seat.

2. The combination of a seat, stationary parts fore and aft of said seat, a hanger slidably and swingingly fitting one of the parts and supporting one end of said seat, a weighted pendulum arm swingingly connected to the other part and means hingedly connecting said pendulum arm to the other end of said seat to support the same from said other part.

3. The combination of a seat, stationary parts fore and aft of said seat, a hanger slidably and swingably fitting one of the parts and supporting one end of said seat, a weighted pendulum arm swingably conected to the other part and supporting the other end of said seat, and spring means assembled between said slidably and swingably fitted hanger and its corresponding stationary part to resiliently support said hanger.

4. The combination of a seat, stationary parts fore and aft of said seat, a hanger slidably and swingably fitting one of the parts and supporting one end of said seat, a weighted pendulum arm swingably connected to the other part and supporting the other end of said seat, spring means assembled between said slidably and swingably fitted hanger and its corresponding stationary part to resiliently support said hanger, and means on said stationary part engaging said hanger when the seat is unoccupied to hold said hanger against swinging movement.

5. The combination of a seat, stationary parts fore and aft of said seat, a hanger slidably and swingably fitting one of the parts and supporting one end of said seat, a weighted pendulum arm swingably connected to the other part and supporting the other end of said seat, spring means assembled between said slidably and swingably fitted hanger and its corresponding stationary part to resiliently support said hanger, a head on the hanger and means on said stationary part engaging said head when the seat is unoccupied to hold said hanger against swinging movement, the said head being released from its engaging means by the weight of an occupant of said seat.

6. The combination of a seat, stationary parts fore and aft of said seat, a hanger slidably and swingably fitting one of the parts and supporting one end of said seat, a weighted pendulum arm swingably connected to the other part and supporting the other end of said seat, spring means assembled between said slidably and swingably fitted hanger and its corresponding stationary part to resiliently support said hanger, means on said stationary part engaging said hanger when the seat is unoccupied to hold said hanger against swinging movement, the said hanger being released from its engaging means by the weight of an occupant of said seat, and an enclosure for the weight of the pendulum arm.

7. The combination of a seat, stationary parts fore and aft of said seat, a hanger slidably and swingably fitting one of the parts and supporting one end of said seat, a weighted pendulum arm swingably connected to the other part and supporting the other end of said seat, spring means assembled between said slidably and swingably fitted hanger and its corresponding stationary part to resiliently support said hanger, and abutment means on said stationary part against which said hanger bears when the seat is unoccupied operative to hold said hanger against swinging movement, the weight of an occupant on said seat serving to depress the spring means to move said seat and hanger to free said hanger from said abutment means.

WILLIS S. FREES.